United States Patent
Yenganti et al.

(10) Patent No.: US 9,307,567 B2
(45) Date of Patent: Apr. 5, 2016

(54) METHODS FOR DETECTING REJOINING NODES IN AN IBSS

(71) Applicant: QUALCOMM Incorporated, San Diego, CA (US)

(72) Inventors: Pradeep Kumar Yenganti, Sunnyvale, CA (US); Lawrie Kurian, San Jose, CA (US); Shailender P. Karmuchi, Fremont, CA (US); Ravi Arun Joshi, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 14/178,018

(22) Filed: Feb. 11, 2014

(65) Prior Publication Data
US 2015/0117326 A1 Apr. 30, 2015

Related U.S. Application Data

(60) Provisional application No. 61/896,477, filed on Oct. 28, 2013.

(51) Int. Cl.
*H04L 12/26* (2006.01)
*H04W 4/00* (2009.01)
(Continued)

(52) U.S. Cl.
CPC .......... *H04W 76/028* (2013.01); *H04W 40/248* (2013.01); *H04W 84/18* (2013.01)

(58) Field of Classification Search
CPC ..... H04W 4/06; H04W 40/24; H04W 40/248; H04W 60/00; H04W 72/04; H04W 72/0413; H04W 76/02; H04W 76/028; H04W 84/18; H04W 84/20; H04L 41/0803; H04L 41/0813; H04L 41/0893; H04L 41/12; H04L 43/10; H04L 67/288; H04L 67/1044; H04L 67/1051; H04L 67/1059; H04L 67/2885; G06F 15/177
USPC .............. 370/236, 252, 310–350, 395.2, 396, 370/400, 431, 437, 461–462; 455/41.2, 455/434, 456.2, 515; 709/208–209, 709/223–224, 227–229, 248
See application file for complete search history.

(56) References Cited

U.S. PATENT DOCUMENTS

| | | |
|---|---|---|
| 7,359,950 B2 * | 4/2008 | Choi ..................... H04W 84/20 709/208 |
| 7,542,452 B2 * | 6/2009 | Penumetsa .................... 370/338 |

(Continued)

OTHER PUBLICATIONS

Aakanksha et al., "A Self-organizing Self-healing On-demand Loop-free Path Routing Protocol Using Mobile Process Groups for Mobile Ad-hoc Networks," 2009 International Conference on Advances in Recent Technologies in Communication and Computing, ARTCom '09, Kottayam, Kerala, Oct. 27-28, 2009, pp. 396-400, ISBN 978-0-7695-3845-7, IEEE Computer Society.

(Continued)

*Primary Examiner* — Tri H Phan
(74) *Attorney, Agent, or Firm* — Holland & Hart LLP

(57) ABSTRACT

Methods, systems, and devices are described for wireless communication. In one method, a first node of an independent basic service set (IBSS) may receive a beacon from a second node of the IBSS. The beacon may include a token. Based at least in part on the token, the first node may determine that the second node has disconnected from and rejoined the IBSS. In another method, a token may be generated at a node. The token may indicate that the node has disconnected from and rejoined an IBSS. A beacon including the token may be transmitted to the IBSS responsive to the node rejoining the IBSS.

30 Claims, 13 Drawing Sheets

(51) Int. Cl.
*H04L 12/28* (2006.01)
*H04W 76/02* (2009.01)
*H04W 40/24* (2009.01)
*H04W 84/18* (2009.01)

(56) References Cited

U.S. PATENT DOCUMENTS

| | | | | |
|---|---|---|---|---|
| 7,814,322 | B2* | 10/2010 | Gurevich et al. | 713/171 |
| 7,987,499 | B2* | 7/2011 | Ptasinski | H04L 63/12 |
| | | | | 726/3 |
| 8,208,455 | B2* | 6/2012 | Ptasinski | H04W 8/22 |
| | | | | 370/328 |
| 2005/0286480 | A1 | 12/2005 | Akiyama | |
| 2006/0039336 | A1* | 2/2006 | Ishimura | H04L 9/0841 |
| | | | | 370/338 |
| 2007/0268856 | A1* | 11/2007 | Wijting | H04W 40/248 |
| | | | | 370/328 |
| 2008/0013566 | A1* | 1/2008 | Smith et al. | 370/447 |
| 2012/0224568 | A1 | 9/2012 | Freda et al. | |
| 2013/0077611 | A1 | 3/2013 | Shaikh et al. | |
| 2013/0170336 | A1 | 7/2013 | Chen et al. | |
| 2013/0265906 | A1* | 10/2013 | Abraham et al. | 370/254 |
| 2015/0006633 | A1* | 1/2015 | Vandwalle | H04L 67/1051 |
| | | | | 709/204 |

OTHER PUBLICATIONS

Chakrabarti et al., "QoS Issues in Ad Hoc Wireless Networks," IEEE Communications Magazine: QoS and Resource Allocation in the 3rd-Generation Wireless Networks, vol. 29, Iss. 2, Feb. 2001, pp. 142-148, ISSN 0163-6804, IEEE Communications Society.
ISA/EPO, International Search Report and Written Opinion of the International Searching Authority, Int'l App. No. PCT/US2014/060853, Feb. 3, 2015, European Patent Office, Rijswijk, NL, 12 pgs.
WI-FI Alliance, "Mobile Ad-Hoc Networking: Wi-Fi Certified™ IBSS with Wi-Fi Protected Setup™," Dec. 2012, 6 pages.
Wunderlich S., "[PATCHv3 0/6] add IBSS channel switch announcement support," Linux wireless networking development ( ), Aug. 19, 2013, Retrieved from the Internet < URL: http://comments.gmane.org/gmane.linux.kernel.wireless.general/112139 >, 5 Pages.

* cited by examiner

METHODS FOR DETECTING REJOINING NODES IN AN IBSS

CROSS REFERENCES

The present application for patent claims priority to U.S. Provisional Patent Application No. 61/896,477 by Yenganti et al., entitled "Methods for Detecting Rejoining Nodes in an IBSS," filed Oct. 28, 2013, assigned to the assignee hereof, and expressly incorporated by reference herein.

BACKGROUND

The following relates generally to wireless communication, and more specifically to wireless communication using an independent basic service set (IBSS). Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include wireless local area network (WLAN) or Wi-Fi systems.

Generally, a wireless multiple-access communications system may include a number of devices (or nodes or stations). An IBSS may include a number of devices that communicate over a WLAN or Wi-Fi spectrum in the absence of a controlling WLAN access point. A device may join an IBSS by transmitting (e.g., broadcasting) beacons with the same service set identification (SSID) and basic service set identification (BSSID) used by an IBSS. A device may disconnect from an IBSS by discontinuing beacon transmission or transmitting beacons associated with a different SSID. The disconnecting device does not notify its peers of its disconnection.

SUMMARY

The described features generally relate to one or more improved methods, systems, and/or devices for wireless communication. Devices that join an IBSS may transmit beacons containing tokens. The tokens may identify different connections established between that device and the IBSS. Thus, for example, when the device joins an IBSS for a first time, the device may include in its beacons a token having a first value. When the device disconnects from and rejoins the IBSS (i.e., establishes a new connection to the IBSS), the device may include in its beacons a token having a second value. The device's peers in the IBSS may therefore determine, based at least in part on the differing token values, when the device has disconnected from and rejoined the IBSS.

In a first set of illustrative examples, a method of wireless communication is described. In one configuration, a first node of an independent basic service set (IBSS) may receive a beacon from a second node of the IBSS. The beacon may include a token. Based at least in part on the token, the first node may determine that the second node has disconnected from and rejoined the IBSS.

In some examples, the token may be a first token. The first token may be compared to a second token associated with the second node, and the determination that the second node has disconnected from and rejoined the IBSS may be based at least in part on a difference between the first token and the second token. In some examples, the second token associated with the second node may be a previously received token from the second node.

A set of resources allocated to a connection between the first node and the second node may be reclaimed responsive to the determination that the second node has disconnected from and rejoined the IBSS. This reclaiming may include, for example, tearing down the connection between the first node and the second node.

A new connection may be set up with the second node responsive to the determination that the second node has disconnected from and rejoined the IBSS. The token of the beacon from the second node may then be associated with the new connection In some examples, an expected sequence number for the second node may be updated in response to determining that the second node has disconnected from and rejoined the IBSS. In certain examples, the beacon from the second node may be received during a monitoring period prior to expiration of a timer associated with detecting the disconnection of the second node.

According to a second set of illustrative examples, a device for wireless communication may include a receiver configured to receive a beacon from a node of an independent basic service set (IBSS), the beacon including a token, and an IBSS connection manager. The IBSS connection manager may be configured to determine, based on the token, that the node has disconnected from and rejoined the IBSS. In certain examples, the IBSS connection manager may be further configured to implement one or more aspects of the method for wireless communication described above with respect to the first set of illustrative examples.

According to a third set of illustrative examples, another method of wireless communication is described. In one configuration, a token may be generated at a node. The token may indicate that the node has disconnected from and rejoined an IBSS. A beacon including the token may be transmitted to the IBSS responsive to the node rejoining the IBSS.

In certain examples, the token may be a first token. The first token may be generated based at least in part on a second token associated with at least one previous connection of the node over the IBSS. For example, the second token may be incremented according to a predefined pattern to generate the first token.

A new connection may be set up with at least a second node of the IBSS responsive to transmitting the beacon comprising the token to the IBSS. In some examples, the beacon may be transmitted prior to an expiration of a monitoring period associated with detecting the disconnection of the node from the IBSS.

According to a fourth set of illustrative embodiments, a device for wireless communication may include an independent basic service set (IBSS) connection manager configured to generate a token, the token indicating that the device has disconnected from and rejoined an IBSS, and a transmitter configured to transmit a beacon including the token to the IBSS responsive to the device rejoining the IBSS. In certain examples, the IBSS connection manager may be further configured to implement one or more aspects of the method for wireless communication described above with reference to the third set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Beacons in an independent basic service set (IBSS) or other ad hoc wireless network may include tokens that identify when the device disconnects from and rejoins the IBSS. Each time the device joins the IBSS, the device may increment or otherwise update the token to a new value. Thus, for example, when a device joins an IBSS for a first time, the device may include in its beacons a token having a first value. When the device disconnects from and rejoins the IBSS, the device may include in its beacons a token having a second value.

The device's peers in the IBSS may therefore determine, based at least in part on the differing token values, when the device has disconnected from and rejoined the IBSS. In this way, the peers may more efficiently manage connections with the device and reallocate resources dedicated to connections with the device as the device disconnects from and rejoins the IBSS.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
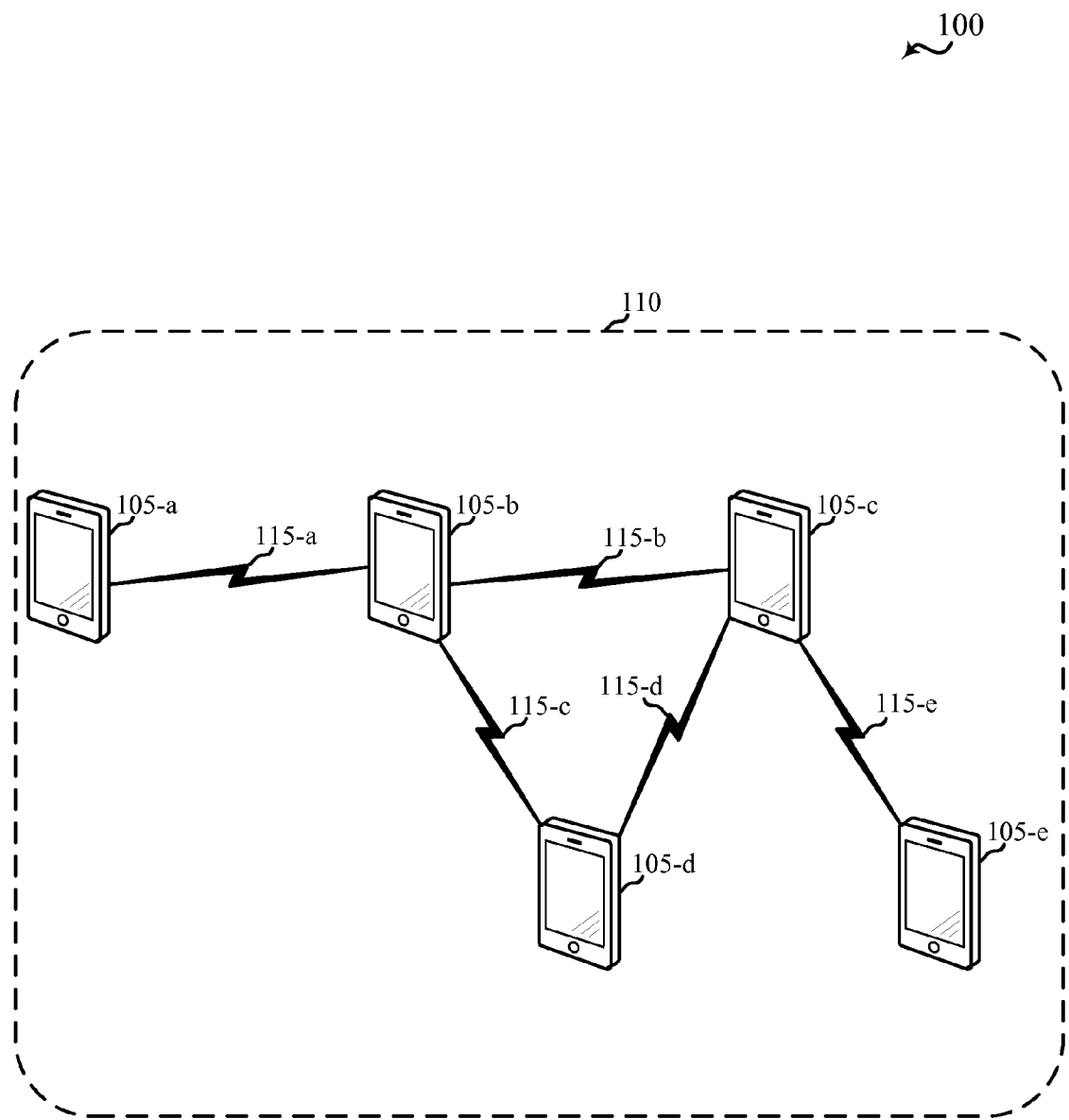
FIG. 1 shows a diagram of an independent basic service set (IBSS)

Referring first to FIG. 1, an ad hoc network of wireless devices may allow wireless devices to communicate with each other in the absence of a controlling access point. One example of an ad hoc wireless network is an independent basic service set (IBSS) 110. An IBSS may conform to the Institute of Electrical and Electronics (IEEE) 802.11 family of standards. Additionally or alternatively, a wireless ad hoc network may conform to one or more other wireless standards.

By way of example, the IBSS 110 shown in FIG. 1 includes five devices (or nodes or stations) 105-*a*, 105-*b*, 105-*c*, 105-*d*, and/or 105-*e*. In some cases, an IBSS may include more or fewer devices 105. Each device 105 may be stationary or mobile and may take any of a number of forms. For example, a device 105 may be a cellular phone, a personal digital assistant (PDA), a tablet computer, a laptop computer, a wearable item such as a watch or glasses, etc.

The devices 105 of the IBSS 110 may communicate with one another via a number of communication links 115-*a*, 115-*b*, 115-*c*, 115-*d*, and/or 115-*e*. Some devices may communicate with each other directly (e.g., device 105-*a* may communicate with device 105-*b* via communication link 115-*a*) and other devices may communicate with each other indirectly (e.g., device 105-*a* may communicate with device 105-*d* via device 105-*b* and communication links 115-*a* and 115-*c*.

A problem with IEEE standard 802.11 is that the standard does not define a mechanism for associating or disassociating with an IBSS. A device 105 joins an IBSS by transmitting (e.g., broadcasting) beacons with the same service set identification (SSID) and basic service set identification (BSSID) used by an IBSS 110. A device 105 may disconnect from an IBSS 110 by discontinuing beacon transmission or transmitting beacons associated with a different SSID. The disconnecting device 105 does not notify its peers of its disconnection.

The lack of a mechanism for disassociating with an IBSS 110 may in some cases be mitigated using a beacon count. That is, owing to the fact that all members of an IBSS 110 should participate in beacon generation, each device 105 of the IBSS 110 may count the number of beacons the device 105 receives from each of the other devices 105 of the IBSS 110 over a period of time. If a count of beacons received at a first device 105 from a second device 105 over a particular period of time is zero, the first device 105 may assume that the second device 105 (the peer of the first device 105) has left the IBSS 110. The first device 105 may then reclaim all of the resources that the first device 105 may have allocated to the second device 105. However, beacon generation in an IBSS 110 may be randomized, such that the period of time (e.g., the monitoring period) over which beacons are counted should be large enough to enable a device 105 to capture a beacon from each of its peers during a monitoring period. A monitoring period that is too short may result in devices 105 reclaiming the resources allocated to peers that are still members of the IBSS 110.

When a device 105 disconnects from and rejoins an IBSS 110, there may be no ambiguity and/or problem if all of the members of the IBSS 110 detect the absence of a beacon from the device 105 before the device 105 rejoins. However, if the device 105 rejoins too early (e.g., before the expiration of a beacon monitoring period in which the device has not transmitted a beacon), the members of the IBSS 110 may not realize the device 105 has disconnected from and rejoined the IBSS 110. This may lead to a number of undesirable scenarios, some of which are discussed below.

In a first scenario, a device 105 may be transmitting unicast data to one or more peer devices 105 in an IBSS 110. If the device 105 leaves and rejoins the IBSS 110, there is a chance that the peer devices may discard transmissions received from the device 105 after the device 105 rejoins the IBSS 110, assuming they are duplicates. For example, assume that two devices 105 of an IBSS are identified as Node A and Node B. During a first (or earlier) IBSS connection, Node A may transmit ping requests to Node B. Prior to disconnecting from the IBSS, Node A may transmit ping requests having media access control (MAC) sequence numbers up to 1000. Node B may track the MAC sequence numbers of the received ping requests, such that Node B expects a next ping request from Node A to be associated with the MAC sequence number 1001. However, upon disconnecting from and rejoining the IBSS (e.g., because a user of the device identified as Node A turned WiFi connectivity OFF and then back ON), Node A may begin transmitting ping requests with MAC sequence numbers starting from 0. If Node A disconnects from and rejoins the IBSS without Node B realizing that Node A has disconnected from and rejoined the IBSS, Node B may drop the next thousand and one ping requests received from Node A, assuming they are duplicates, and expecting the next ping request to be associated with MAC sequence number 1001.

In a second scenario, one or more peer devices 105 of an IBSS 110 may be in the process of transmitting data to a device 105 when the device 105 disconnects from and rejoins the IBSS 110. If the device 105 disconnects from and rejoins the IBSS 110 without its peer devices 105 realizing that the device 105 has disconnected from and rejoined the IBSS 110, the peer devices 105 may continue their transmissions to the device 105 after the device 105 rejoins. Though the MAC layer of the device 105 may allow the transmissions from the peer devices to be received by the device 105, packets received from the peer devices 105 subsequent to the rejoin may be discarded by one or more higher layers of the device 105. For example, assume that two devices 105 of an IBSS 110 are identified as Node A and Node B. An application running on Node B may be in the process of transferring a large file to an application running on Node A. If Node A disconnects from and rejoins the IBSS, the application running on Node A may be terminated. If Node B fails to detect that Node A disconnected from and rejoined the IBSS, Node B may continue to transmit data to Node A. The MAC layer of Node A may acknowledge receiving the data, but the application layer of Node A may discard the data, as no application or socket is open to receive the data.

In a third scenario, a Block acknowledgement (ACK) session may be set up between two peer devices 105 of an IBSS 110. If a first device 105 disconnects from and rejoins the IBSS 110 without the second device 105 knowing, the second device 105 may continue to aggregate and transmit packets to the first device 105, which the first device discards. Because the second device 105 does not receive a Block ACK from the first device 105, the second device 105 may wrongly assume that the packet error rate (PER) is too high and reduce the physical data rate of transmissions to the first device 105, which may result in an artificially lower throughput between the devices 105.

All of the above scenarios may result in loss of connectivity and/or inefficient utilization of the bandwidth of IBSS 110 bandwidth.

Figure 2:
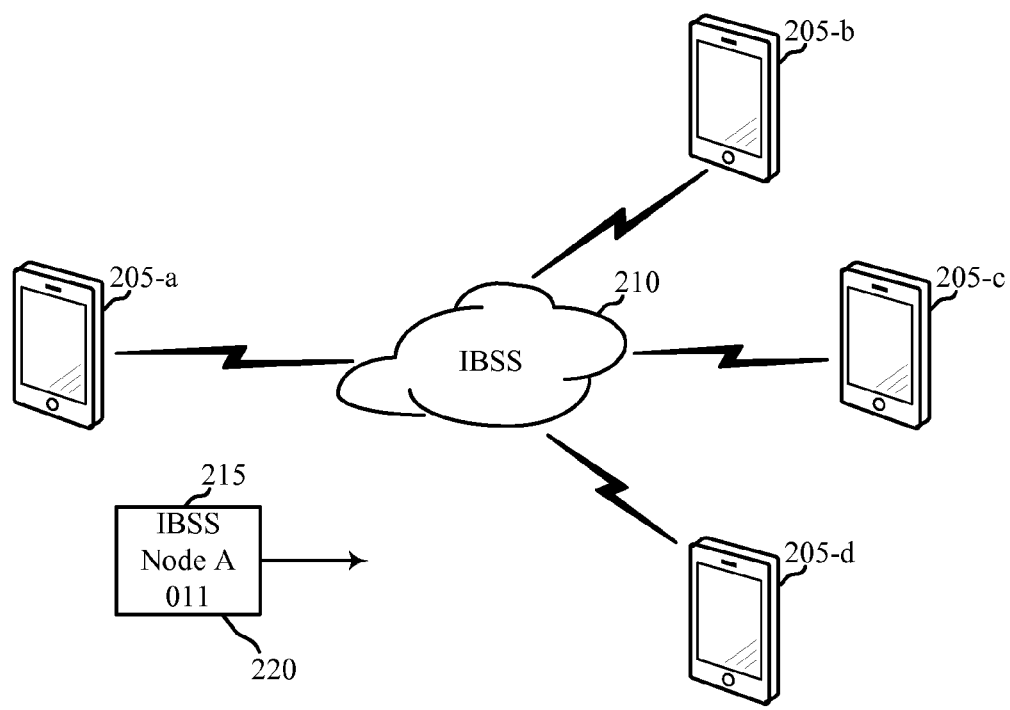
FIG. 2 shows a block diagram of an IBSS to which a number of devices (or nodes or stations) belong, in accordance with various aspects of the present disclosure.

Turning now to FIG. 2, there is shown a block diagram 200 of an IBSS 210 to which a number of devices (or nodes or stations) 205-a, 205-b, 205-c, and/or 205-d belong. Although the IBSS 210 includes the devices 205-a, 205-b, 205-c, and/or 205-d, a cloud in FIG. 2 is used to illustrate the fact that other devices 205 may or may not bridge the communication links between the devices 205-a, 205-b, 205-c, and/or 205-d. In some cases, an IBSS 210 may include more or fewer devices 205. In some embodiments, the devices 205 may be examples of one or more aspects of the devices 105 described with reference to FIG. 1.

A device (e.g., device 205-a) may join the IBSS 210 by transmitting a beacon 215 that identifies the IBSS 210 and the device 205-a (e.g., IBSS/Node A). The beacon 215 may also include a token 220. The token 220 may be, for example, an integer value of a counter. The token 220 may be used to identify a particular joinder (or connection) of the device 205-a to the IBSS 210. Thus, a first joinder of the device 205-a may be associated with beacon transmissions including the token "011". If the device 205-a later disconnects from and rejoins the IBSS 210, the beacon transmissions associated with its second joinder may include the token "012." In some cases, a device 205-a may increment a previously used token according to a predefined pattern to generate a subsequently used token. This incrementing may be implemented using, for example, a counter. In other cases, a subsequent token may be generated randomly, pseudo-randomly, or in other ways.

Peer devices 205-b, 205-c, and/or 205-d may read the tokens transmitted in the beacons of the device 205-a, and may determine that the device 205-a disconnected from and rejoined the IBSS 210 as described with reference to FIG. 3.

Figure 3:
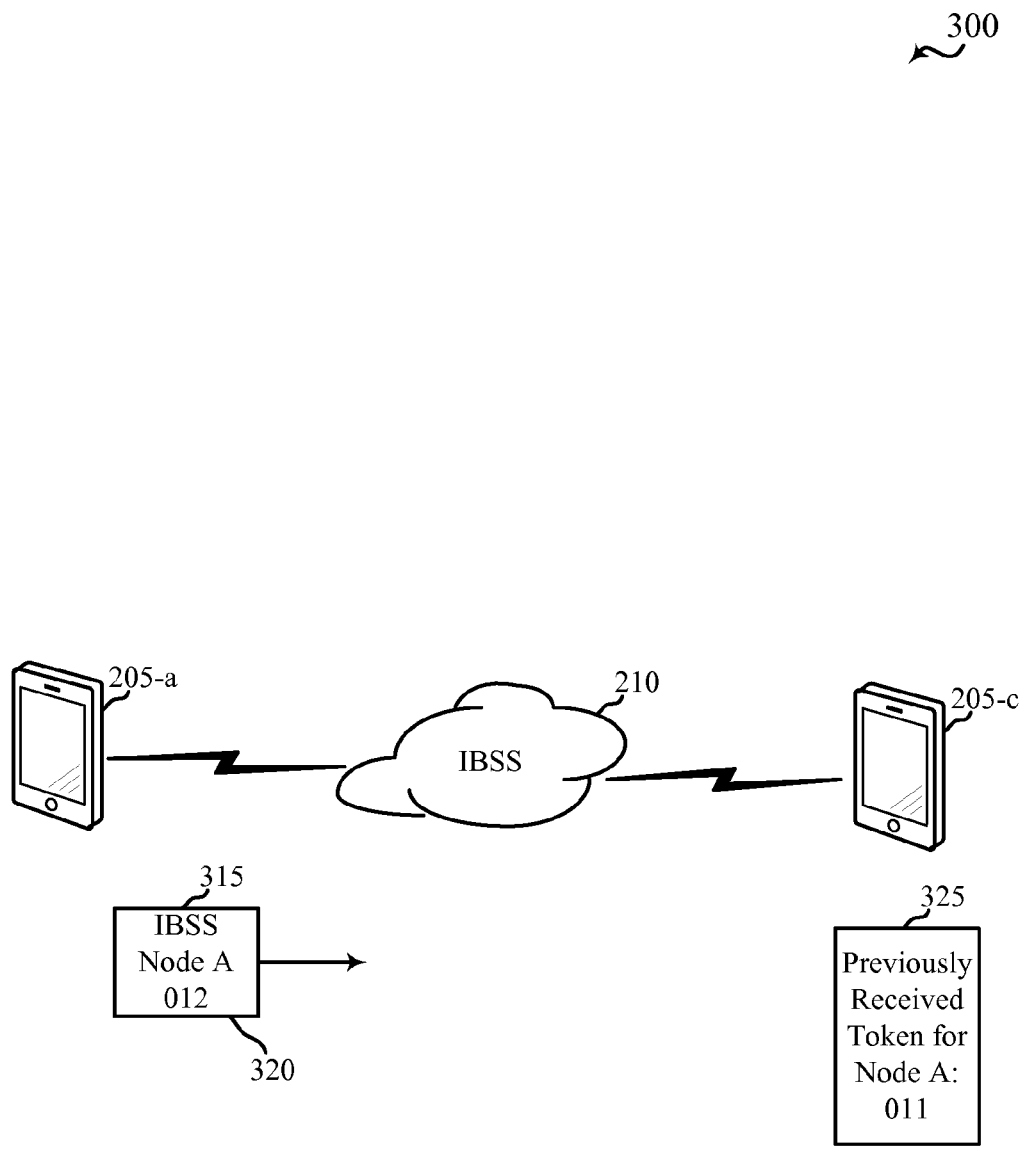
FIG. 3 shows a block diagram of a portion of the IBSS described with reference to FIG. 2, in accordance with various aspects of the present disclosure.

FIG. 3 shows a block diagram 300 of a portion of the IBSS 210 described with reference to FIG. 2. The portion of the IBSS 210 shown in FIG. 3 includes devices 205-a and 205-c and shows a state of communications between the devices 205-a, 205-c after device 205-a has disconnected from and rejoined the IBSS 210.

Prior to detecting that the device 205-a disconnected from and rejoined the IBSS 210, the device 205-c may store a previously received token 325 for the device 205-a, which device 205-a identified itself to the IBSS 210 as Node A. In the example shown, the previously received token has a value of 011.

Subsequent to the device 205-a disconnecting from and rejoining the IBSS 210, the device 205-a may transmit beacons 315 including the token 320, which token 320 has a value of 012. Upon receipt of the beacon 315 by the device 205-c, the device 205-c may compare the token 320 to the previously received token 325 and determine that the token 320 has a value that differs from the value of the previously received token 325 for Node A. Based at least in part on the difference, the device 205-c may determine that device 205-a disconnected from and rejoined the IBSS 210 and the devices 205-a, 205-c may establish a new connection.

Figure 4:
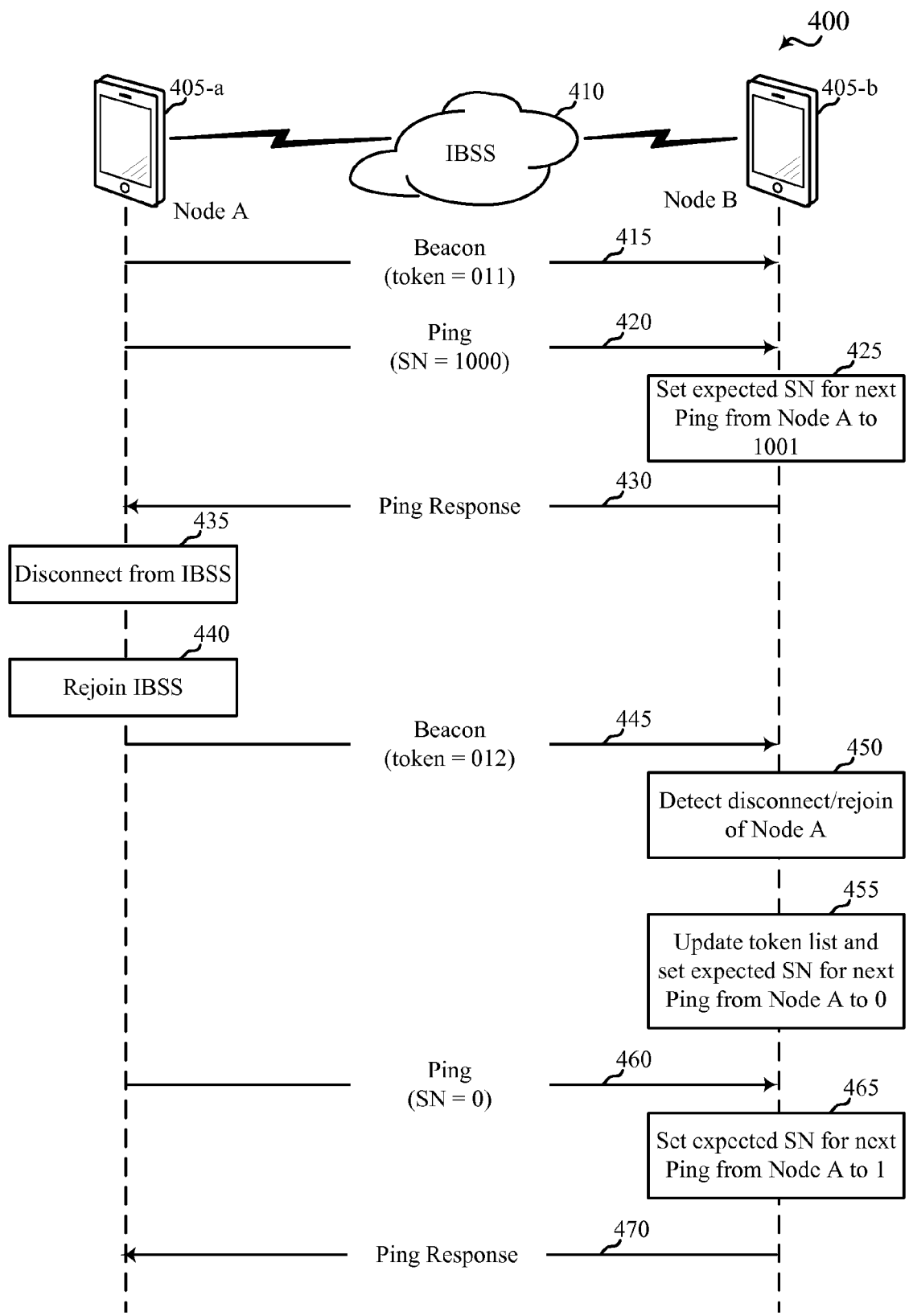
FIG. 4 shows a message flow diagram illustrating wireless communication between a first device and a second device associated with an IBSS, in accordance with various aspects of the present disclosure.

FIG. 4 is a message flow diagram 400 illustrating wireless communication between a first device 405-a and a second device 405-b associated with an IBSS 410. The first device 405-a may identify itself to the IBSS 410 as Node A, and the second device 405-*b* may identify itself to the IBSS 410 as Node B. In some embodiments, the devices 405-*a* and 405-*b* may be examples of one or more aspects of the devices 105 and/or 205 described with reference to FIGS. 1, 2, and/or 3.

By way of example, the message flow begins with Node A broadcasting a beacon 415. The beacon 415 may identify Node A to Node B and include a token (e.g., 011) that identifies a particular joinder (or connection) of Node A to the IBSS 410. Node B may store or otherwise track the value of Node A's token.

Subsequent to joining the IBSS 410, Node A may send a Ping 420 to Node B. The Ping 420 may be associated with a MAC sequence number (SN) of 1000. Upon receiving the Ping 420, and at block 425, Node B may set an expected SN for a next Ping from Node A to 1001 and respond to the Ping 420 with a Ping Response 430.

At block 435, Node A may disconnect from the IBSS 410, and at block 440, Node A may rejoin the IBSS 410. The disconnection and rejoinder may be completed prior to an expiration of a monitoring period associated with detecting the disconnection of Node A from the IBSS. Thus, Node B may be unaware of the disconnection and rejoinder of Node A from/to the IBSS 410.

Subsequent to rejoining the IBSS 410, Node A may broadcast a beacon 445. The beacon 445 may identify Node A to Node B and include an incremented or otherwise different token (e.g., 012) that identifies a rejoinder (or new connection) of Node A to the IBSS 410. Upon reading the token associated with the rejoinder of Node A to the IBSS 410, Node B may compare the new token with a previously received token for Node A and determine (or detect), at block 450, the disconnection and rejoinder of Node A from/to the IBSS 410. Based at least in part on this determination, Node B may update its stored token(s) for Node A to include the new token, at block 455, and set an expected SN for a next Ping from Node A to 0.

Upon receiving the Ping 460 from Node A, Node B may, at block 465, set an expected SN for a next Ping from Node A to 1. Node B may also return a Ping Response 470 to Node A.

The message flow diagram 400 shows how a node's transmission of a token identifying its particular connection to an IBSS may alleviate the undesirable first scenario described earlier.

Figure 5:
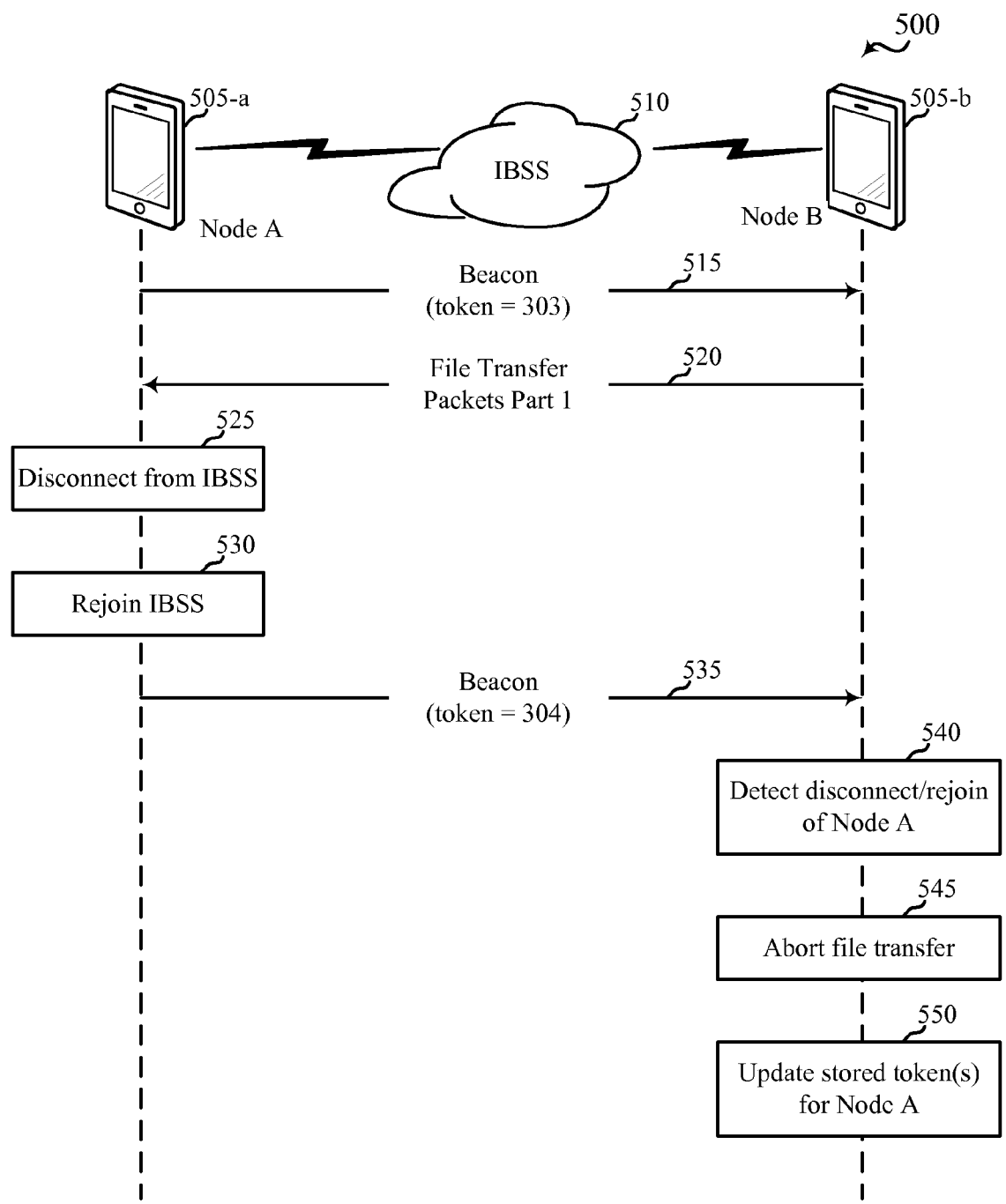
FIG. 5 shows a message flow diagram illustrating wireless communication between a first device and a second device associated with an IBSS, in accordance with various aspects of the present disclosure.

FIG. 5 is a message flow diagram 500 illustrating wireless communication between a first device 505-*a* and a second device 505-*b* associated with an IBSS 510. The first device 505-*a* may identify itself to the IBSS 510 as Node A, and the second device 505-*b* may identify itself to the IBSS 510 as Node B. In some embodiments, the devices 505-*a* and 505-*b* may be examples of one or more aspects of the devices 105, 205, and/or 405 described with reference to FIGS. 1, 2, 3, and/or 4.

By way of example, the message flow begins with Node A broadcasting a beacon 515. The beacon 515 may identify Node A to Node B and include a token (e.g., 303) that identifies a particular joinder (or connection) of Node A to the IBSS 510. Node B may store or otherwise track the value of Node A's token.

Subsequent to joining the IBSS 510, Node A may receive part of a file transfer 520 (e.g., Packets Part 1) from Node B.

At block 525, Node A may disconnect from the IBSS 510, and at block 530, Node A may rejoin the IBSS 510. The disconnection and rejoinder may be completed prior to an expiration of a monitoring period associated with detecting the disconnection of Node A from the IBSS. Thus, Node B may be unaware of the disconnection and rejoinder of Node A from/to the IBSS 510.

Subsequent to rejoining the IBSS 510, Node A may broadcast a beacon 535. The beacon 535 may identify Node A to Node B and include an incremented token (e.g., 304) that identifies a rejoinder (or new connection) of Node A to the IBSS 510. Upon reading the token associated with the rejoinder of Node A to the IBSS 510, Node B may compare the new token with a previously received token for Node A and determine (or detect), at block 540, the disconnection and rejoinder of Node A from/to the IBSS 510. Based at least in part on this determination, and at block 545, Node B may abort its previously started file transfer to Node A. At block 550, Node B may update its stored token(s) for Node A to include the new token.

The message flow diagram 500 shows how a node's transmission of a token identifying its particular connection to an IBSS may alleviate the undesirable second scenario described earlier.

Figure 6:
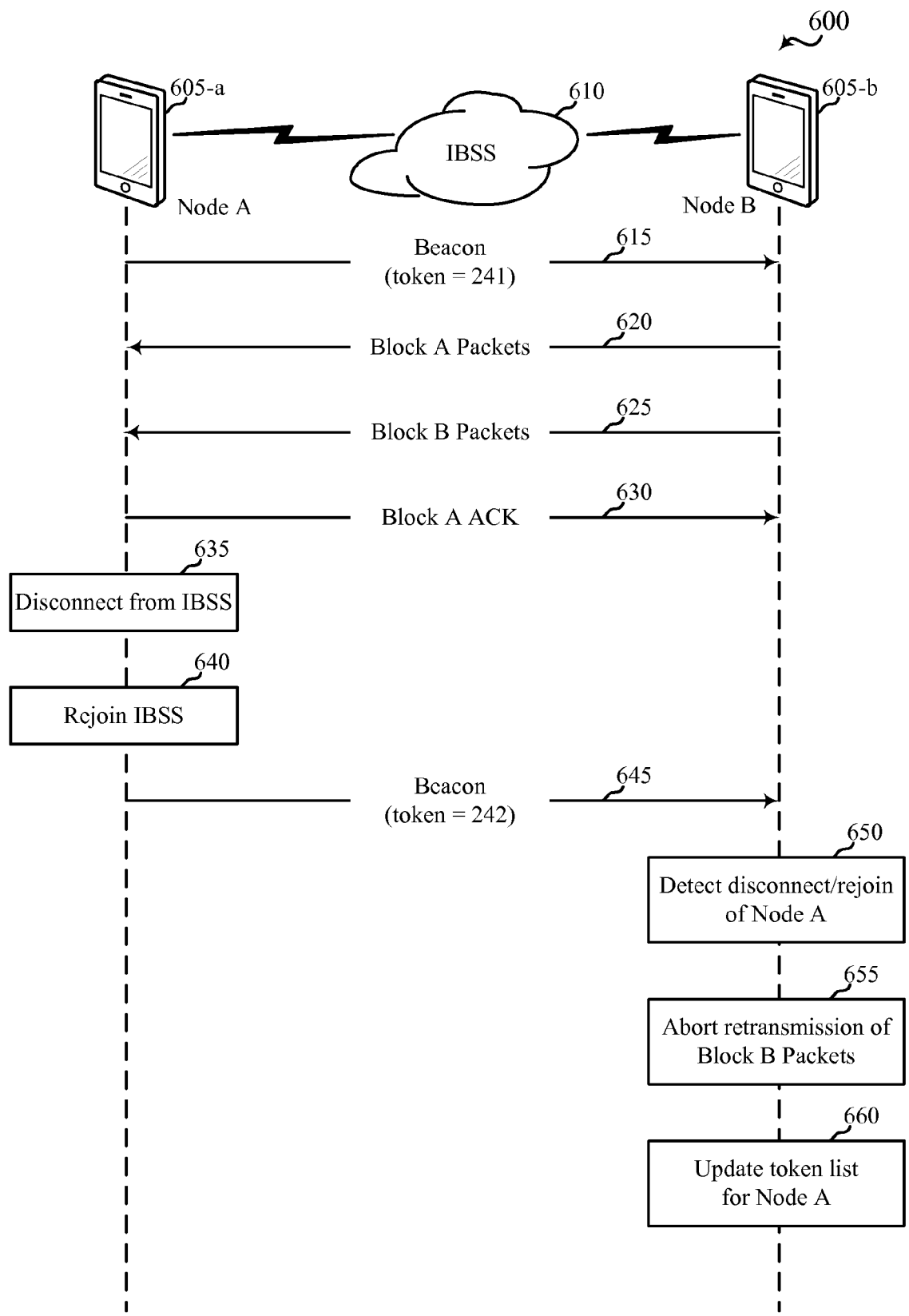
FIG. 6 shows a message flow diagram illustrating wireless communication between a first device and a second device associated with an IBSS, in accordance with various aspects of the present disclosure.

FIG. 6 is a message flow diagram 600 illustrating wireless communication between a first device 605-*a* and a second device 605-*b* associated with an IBSS 610. The first device 605-*a* may identify itself to the IBSS 610 as Node A, and the second device 605-*b* may identify itself to the IBSS 610 as Node B. In some embodiments, the devices 605-*a* and 605-*b* may be examples of one or more aspects of the devices 105, 205, 405, and/or 505 described with reference to FIGS. 1, 2, 3, 4, and/or 5.

By way of example, the message flow begins with Node A broadcasting a beacon 615. The beacon 615 may identify Node A to Node B and include a token (e.g., 241) that identifies a particular joinder (or connection) of Node A to the IBSS 610. Node B may store or otherwise track the value of Node A's token.

Subsequent to joining the IBSS 610, Node A may receive from Node B Block A Packets 620 and Block B Packets 625. Node A may acknowledge receipt of the Block A Packets 620 with a Block A ACK 630. However, before acknowledging receipt of the Block B Packets 625, and at block 635, Node A may disconnect from the IBSS 610. At block 640, Node A may rejoin the IBSS 610. The disconnection and rejoinder may be completed prior to an expiration of a monitoring period associated with detecting the disconnection of Node A from the IBSS. Thus, Node B may be unaware of the disconnection and rejoinder of Node A from/to the IBSS 610.

Subsequent to rejoining the IBSS 610, Node A may broadcast a beacon 645. The beacon 645 may identify Node A to Node B and include an incremented token (e.g., 242) that identifies a rejoinder (or new connection) of Node A to the IBSS 610. Upon reading the token associated with the rejoinder of Node A to the IBSS 610, Node B may compare the new token with a previously received token for Node A and determine (or detect), at block 650, the disconnection and rejoinder of Node A from/to the IBSS 610. Based at least in part on this determination, and at block 655, Node B may abort a retransmission of the Block B Packets, which packets may be identified for retransmission because of Node A's failure to acknowledge receipt of same. At block 660, Node B may update its stored token(s) for Node A to include the new token.

The message flow diagram 600 shows how a node's transmission of a token identifying its particular connection to an IBSS may alleviate the undesirable third scenario described earlier.

Figure 7:
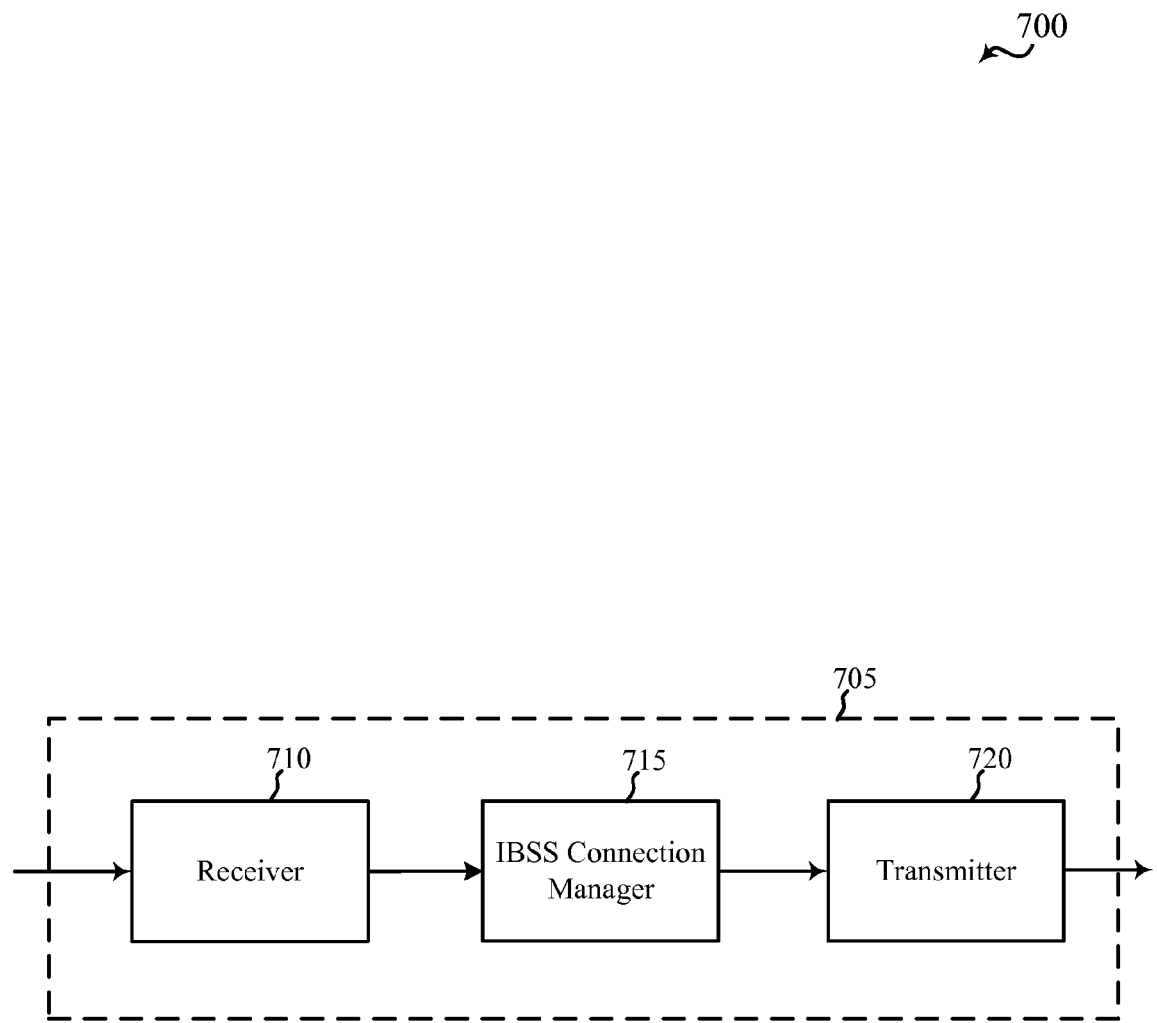
FIG. 7 shows a block diagram of a device for use in wireless communication, in accordance with various aspects of the present disclosure.

FIG. 7 shows a block diagram 700 of a device 705 for use in wireless communication, in accordance with various aspects of the present disclosure. In some embodiments, the device 705 may be an example of one or more aspects of one or more of the client devices described with reference to FIGS. 1, 2, 3, 4, 5, and/or 6. The device 705 may also be a processor. The device 705 may include a receiver 710, an IBSS connection manager 715, and/or a transmitter 720. Each of these components may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 710 may be or include a radio frequency (RF) receiver, such as an RF receiver operable to receive transmissions in a frequency spectrum used for WLAN communications. The receiver 710 may also, or alternately, include another type of RF receiver, such as a cellular receiver.

The receiver 710 may be used to receive various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

In some embodiments, the transmitter 720 may be or include an RF transmitter, such as an RF transmitter operable to transmit in a frequency spectrum used for WLAN communications. The transmitter 720 may also, or alternately, include another type of RF receiver, such as a cellular receiver.

The transmitter 720 may be used to transmit various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

The IBSS connection manager 715 may be used to manage one or more IBSS connections of the device 705. In some cases, the device 705 may disconnect from and rejoin an IBSS. The rejoin may be made under control of, or with the assistance of, the IBSS connection manager 715. In these cases, the IBSS connection manager 715 may generate a token indicating that the device 705 has disconnected from and rejoined the IBSS. Responsive to the device 705 rejoining the IBSS, the IBSS connection manager 715 may then transmit a beacon including the token to the IBSS. In other cases, the device 705 may be a node of an IBSS when the IBSS connection manager 715 receives a beacon from another device (or node) of the IBSS. The received beacon may include a token. The IBSS connection manager 715 may determine, based at least in part on the token, whether the device 705 has disconnected from and rejoined the IBSS.

Figure 8:
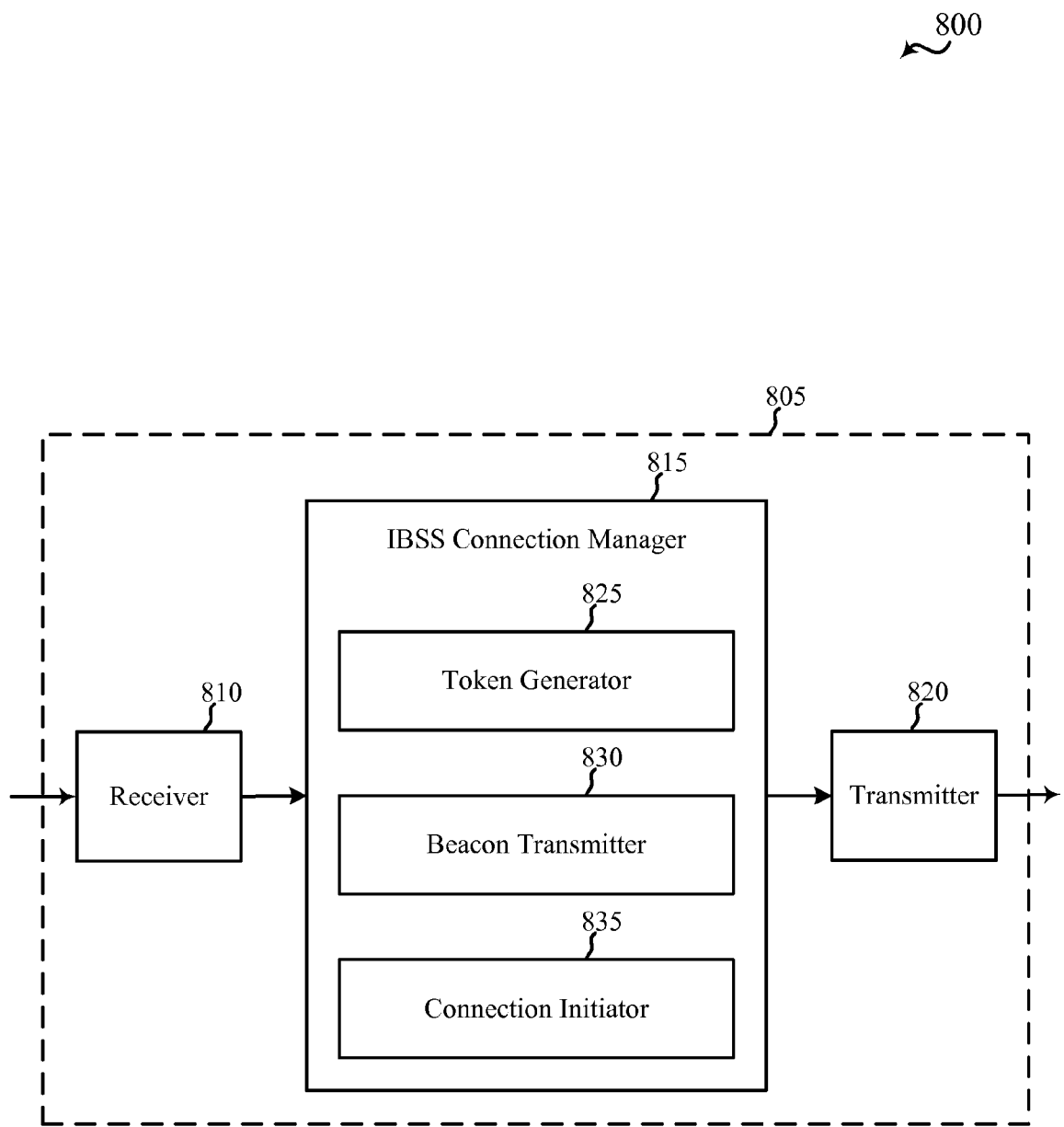
FIG. 8 shows a block diagram of a device for use in wireless communication, in accordance with various aspects of the present disclosure.

FIG. 8 shows a block diagram 800 of a device 805 for use in wireless communication, in accordance with various aspects of the present disclosure. In some embodiments, the device 805 may be an example of one or more aspects of one or more of the client devices described with reference to FIGS. 1, 2, 3, 4, 5, and/or 6. The device 805 may also be a processor. The device 805 may include a receiver 810, an IBSS connection manager 815, and/or a transmitter 820. Each of these components may be in communication with each other.

The components of the device 805 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 810 may be or include a radio frequency (RF) receiver, such as an RF receiver operable to receive transmissions in a frequency spectrum used for WLAN communications. The receiver 810 may also, or alternately, include another type of RF receiver, such as a cellular receiver.

The receiver 810 may be used to receive various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

In some embodiments, the transmitter 820 may be or include an RF transmitter, such as an RF transmitter operable to transmit in a frequency spectrum used for WLAN communications. The transmitter 820 may also, or alternately, include another type of RF receiver, such as a cellular receiver.

The transmitter 820 may be used to transmit various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

The IBSS connection manager 815 may be an example of one or more aspects of the IBSS connection manager 715 described with reference to FIG. 7, and may in some cases include a token generator 825, a beacon transmitter 830, and/or a connection initiator 835. Each of these components may be in communication with each other.

In some embodiments, the token generator 825 may be used to generate a token indicating that the device 805 has disconnected from and rejoined an IBSS. The token may in some cases include a first token, which first token may be generated based at least in part on a second token. For example, the first token may be generated by incrementing the second token according to a predefined pattern. The second token may be associated with at least one previous connection of the device 805 over the IBSS (e.g., one or more connections to one or more other devices (or nodes)).

In some embodiments, the beacon transmitter 830 may be used to transmit a beacon including the token generated by the token generator 825 to the IBSS. The beacon transmitter 830 may transmit the beacon responsive to the device 805 rejoining the IBSS. In some embodiments, the beacon transmitter 830 may transmit the beacon prior to expiration of a monitoring period. The monitoring period may be associated with detecting the disconnection of the device 805 from the IBSS.

In some embodiments, the connection initiator 835 may be used to set up or establish a new connection with at least a second node of the IBSS. The connection initiator 835 may set up the new connection responsive to transmitting the beacon including the first token to the IBSS.

Figure 9:
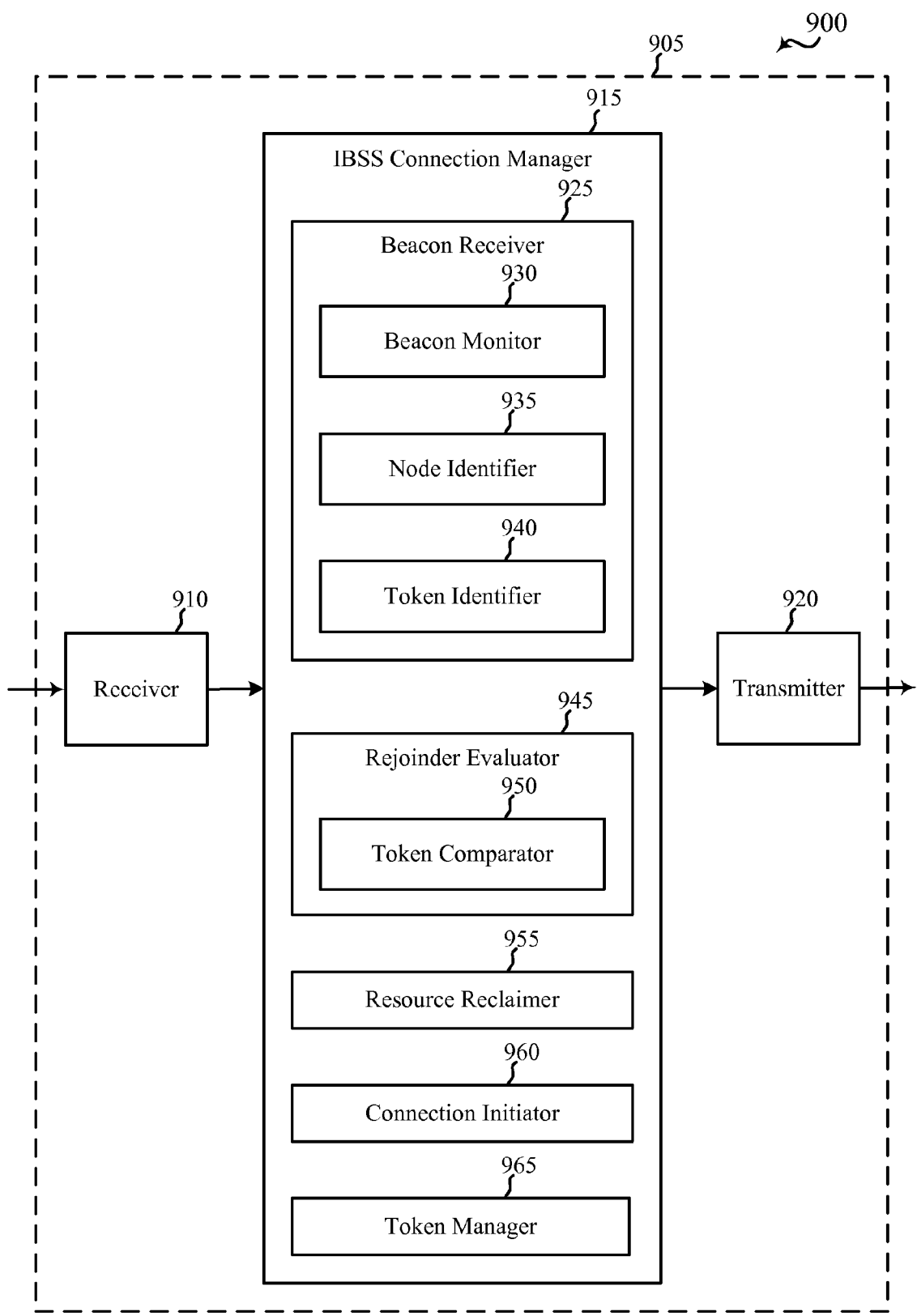
FIG. 9 shows a block diagram of a device for use in wireless communication, in accordance with various aspects of the present disclosure.

FIG. 9 shows a block diagram 900 of a device 905 for use in wireless communication, in accordance with various aspects of the present disclosure. In some embodiments, the device 905 may be an example of one or more aspects of one or more of the client devices described with reference to FIGS. 1, 2, 3, 4, 5, and/or 6. The device 905 may also be a processor. The device 905 may include a receiver 910, an IBSS connection manager 915, and/or a transmitter 920. Each of these components may be in communication with each other.

The components of the device 905 may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 910 may be or include a radio frequency (RF) receiver, such as an RF receiver operable to receive transmissions in a frequency spectrum used for WLAN communications. The receiver 910 may also, or alternately, include another type of RF receiver, such as a cellular receiver.

The receiver 910 may be used to receive various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

In some embodiments, the transmitter 920 may be or include an RF transmitter, such as an RF transmitter operable to transmit in a frequency spectrum used for WLAN communications. The transmitter 920 may also, or alternately, include another type of RF receiver, such as a cellular receiver.

The transmitter 920 may be used to transmit various types of data and/or control signals (i.e., transmissions) over one or more communication links of a wireless communication system, such as one or more communication links of an IBSS such as the IBSS 110, 210, 310, 410, 510, and/or 610 described with reference to FIGS. 1, 2, 3, 4, 5, and/or 6.

The IBSS connection manager 915 may be an example of one or more aspects of the IBSS connection manager 715 and/or 815 described with reference to FIGS. 7 and/or 8, and may in some cases include a beacon receiver 925, a rejoinder evaluator 945, a resource reclaimer 955, a connection initiator 960, and/or a token manager 965. Each of these components may be in communication with each other.

In some embodiments, the beacon receiver 925 may be used to receive a beacon from another device (or node) of the IBSS. The beacon receiver 925 may in some cases include a beacon monitor 930, a node identifier 935, and/or a token identifier 940. Each of these component may be in communication with each other. The beacon monitor 930 may be used to monitor at least one radio frequency for a beacon. Upon the beacon monitor's receipt of a beacon, the node identifier 935 may be used to determine the identity of a second device (or node) of the IBSS, which second device transmitted the beacon. The node identifier 935 may in some cases determine the identity of the second device based at least in part on a node identifier included in the beacon. The token identifier 940 may be used to identify a token included in the beacon. The token include in the beacon may be referred to as a first token.

In some embodiments, the beacon from the second node may be received by the beacon receiver 925 during a monitoring period, prior to expiration of a timer associated with detecting the disconnection of the second device.

In some embodiments, the rejoinder evaluator 945 may be used to evaluate or determine, based at least in part on the first token received by the beacon receiver 925, whether the device 905 has disconnected from and rejoined the IBSS. The rejoinder evaluator 945 may in some cases include a token comparator 950. The token comparator 950 may be used to determine whether a token associated with the second device was previously received by the device 905. The existence of a previously received token associated with the second device may indicate that the second device was previously connected to the IBSS, but at some point disconnected from and rejoined the IBSS. The previously received token, when it exists, may be referred to as a second token. The token comparator 950 may compare the first token to the second token to determine whether there is a difference between the first token and the second token. When there is a difference between the first token and the second, the rejoinder evaluator 945 may determine that the second device has disconnected from and rejoined the IBSS.

In some embodiments, the resource reclaimer 955 may be used in response to a determination by the rejoinder evaluator 945 that the second device disconnected from and rejoined the IBSS to reclaim a set of resources allocated to a connection between the device 905 and the second device. The connection between the device 905 and the second device may be a connection that existed between the device 905 and the second device before the second device disconnected from and rejoined the IBSS. In some cases, the resource reclaimer 955 may reclaim the set of resources allocated to the connection between the device 905 and the second device by tearing down the connection between the device 905 and the second device.

In some embodiments, the connection initiator 960 may be used in response to a determination by the rejoinder evaluator 945 that the second device disconnected from and rejoined the IBSS to set up a new connection between the device 905 and the second device. In certain examples, the connection initiator 960 may update an expected sequence number for the second device in response to the determination that the second device has disconnected from and rejoined the IBSS.

In some embodiments, the token manager 965 may be used to associate the token included in the beacon received by the beacon receiver 925 with the second device (or with another device or node from which the beacon is received).

Figure 10:
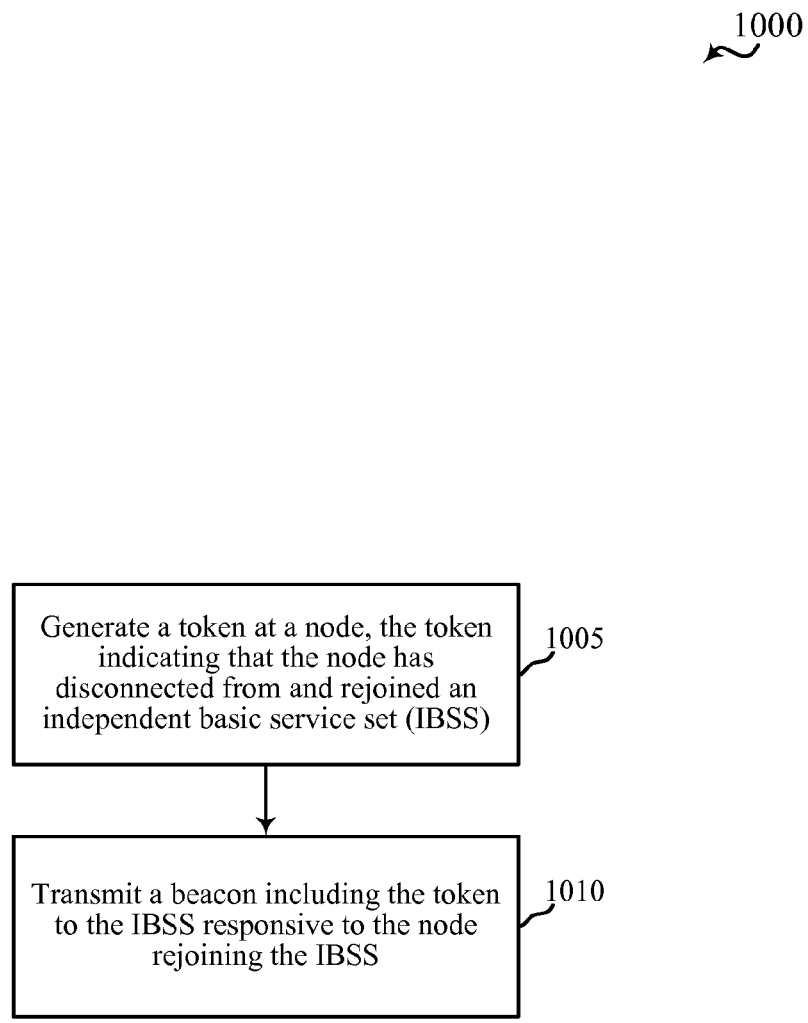
FIG. 10 shows a flowchart diagram illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to one or more aspects of the device 705 and/or 805 described with reference to FIGS. 7 and/or 8. In some embodiments, a device such as one of the devices 705 and/or 805 may execute one or more sets of codes to control the functional elements of the device to perform the functions described below.

At block 1005, a token may be generated at a node. The node may in some cases include one or more aspects of the device 705 and/or 805 described with reference to FIGS. 7 and/or 8. The token may indicate that the node has disconnected from and rejoined an IBSS. The operation(s) at block 1005 may in some cases be performed using the IBSS connection manager 715 and/or 815 described with reference to FIGS. 7 and/or 8, and/or the token generator 825 described with reference to FIG. 8.

At block 1010, a beacon including the token may be transmitted to the IBSS, responsive to the node rejoining the IBSS. The operation(s) at block 1010 may in some cases be performed using the IBSS connection manager 715 and/or 815 described with reference to FIGS. 7 and/or 8, and/or the beacon transmitter 830 described with reference to FIG. 8.

In some embodiments, the beacon may be transmitted prior to expiration of a monitoring period. The monitoring period may be associated with detecting the disconnection of the node from the IBSS.

Thus, the method 1000 may provide for wireless communication. The method 1000 is just one implementation and the operations of the method 1000 may be rearranged or otherwise modified such that other implementations are possible.

Figure 11:
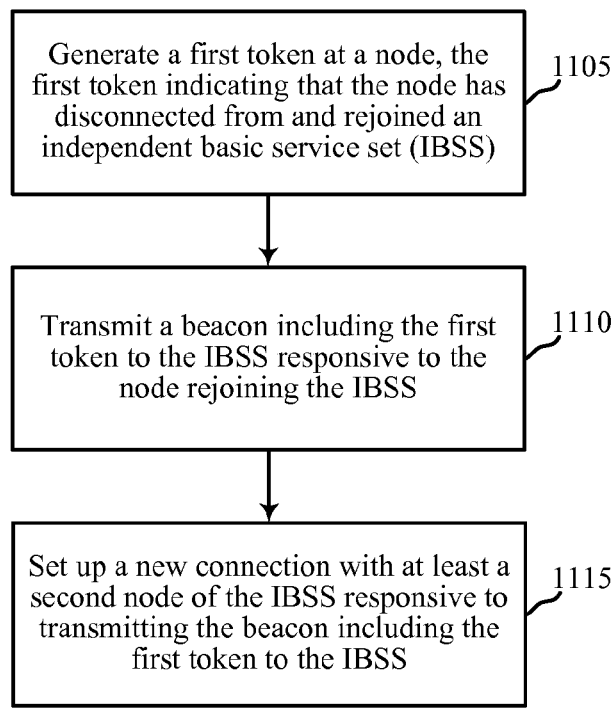
FIG. 11 shows a flowchart diagram illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to one or more aspects of the device 705 and/or 805 described with reference to FIGS. 7 and/or 8. In some embodiments, a device such as one of the devices 705 and/or 805 may execute one or more sets of codes to control the functional elements of the device to perform the functions described below.

At block 1105, a first token may be generated at a node. The node may in some cases include one or more aspects of the device 705 and/or 805 described with reference to FIGS. 7 and/or 8. The first token may indicate that the node has disconnected from and rejoined an IBSS. The first token may in some cases be generated based at least in part on a second token. For example, the first token may be generated by incrementing the second token according to a predefined pattern. The second token may be associated with at least one previous connection of the node over the IBSS (e.g., one or more connections to one or more other nodes). The operation(s) at block 1105 may in some cases be performed using the IBSS connection manager 715 and/or 815 described with reference to FIGS. 7 and/or 8, and/or the token generator 825 described with reference to FIG. 8.

At block 1110, a beacon including the first token may be transmitted to the IBSS, responsive to the node rejoining the IBSS. The operation(s) at block 1110 may in some cases be performed using the IBSS connection manager 715 and/or 815 described with reference to FIGS. 7 and/or 8, and/or the beacon transmitter 830 described with reference to FIG. 8.

In some embodiments, the beacon may be transmitted prior to expiration of a monitoring period. The monitoring period may be associated with detecting the disconnection of the node from the IBSS.

At block 1115, a new connection may be set up with at least a second node of the IBSS, responsive to transmitting the beacon including the first token to the IBSS. The operation(s) at block 1115 may in some cases be performed using the IBSS connection manager 715 and/or 815 described with reference to FIGS. 7 and/or 8, and/or the connection initiator 835 described with reference to FIG. 8.

Thus, the method 1100 may provide for wireless communication. The method 1100 is just one implementation and the operations of the method 1100 may be rearranged or otherwise modified such that other implementations are possible.

Figure 12:
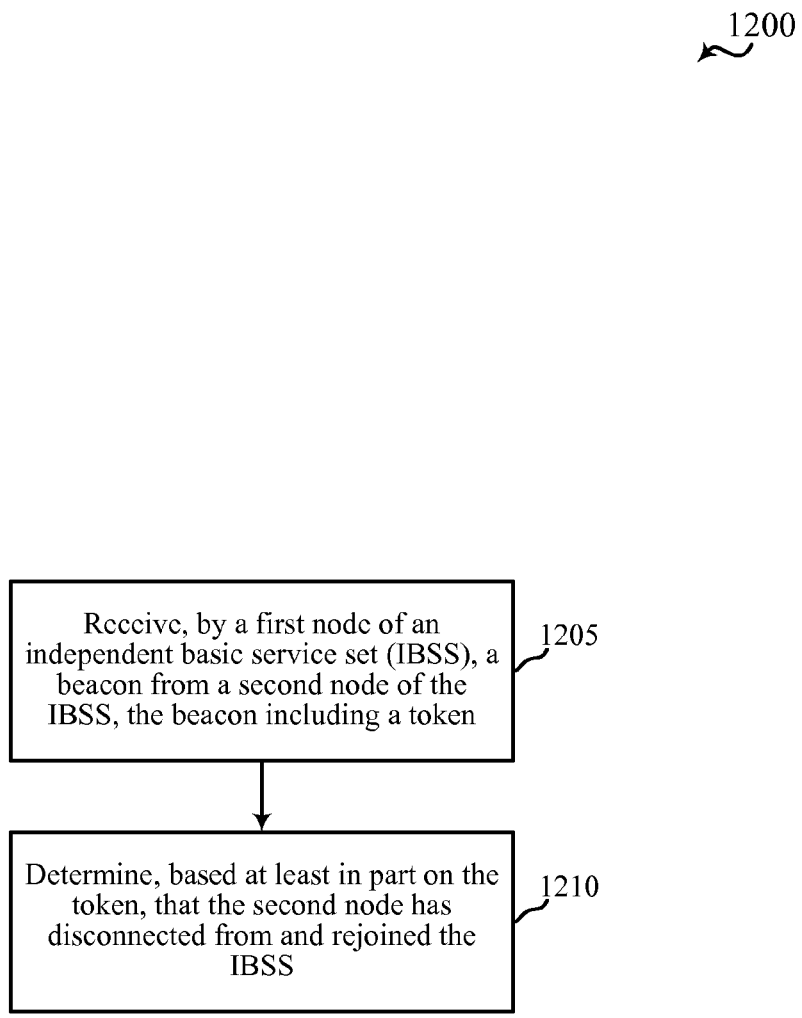
FIG. 12 shows a flowchart diagram illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to one or more aspects of the device 705 and/or 905 described with reference to FIGS. 7 and/or 9. In some embodiments, a device such as one of the devices 705 and/or 905 may execute one or more sets of codes to control the functional elements of the device to perform the functions described below.

At block 1205, a first node of an IBSS may receive a beacon from a second node of an IBSS. The beacon may include a token. The first node may in some cases include one or more aspects of the device 705 and/or 905 described with reference to FIGS. 7 and/or 9, and the second node may in some cases include one or more aspects of the device 705 and/or 805 described with reference to FIGS. 7 and/or 8. The operation(s) at block 1205 may in some cases be performed using the IBSS connection manager 715 and/or 915 described with reference to FIGS. 7 and/or 9, and/or the beacon receiver 925 described with reference to FIG. 9.

In some embodiments, the beacon from the second node may be received during a monitoring period, prior to expiration of a timer associated with detecting the disconnection of the second node.

At block 1210, and based at least in part on the token received at block 1205, the first node may determine that the second node has disconnected from and rejoined the IBSS. The operation(s) at block 1210 may in some cases be performed using the IBSS connection manager 715 and/or 915 described with reference to FIGS. 7 and/or 9, and/or the rejoinder evaluator 945 described with reference to FIG. 9.

Thus, the method 1200 may provide for wireless communication. The method 1200 is just one implementation and the operations of the method 1200 may be rearranged or otherwise modified such that other implementations are possible.

Figure 13:
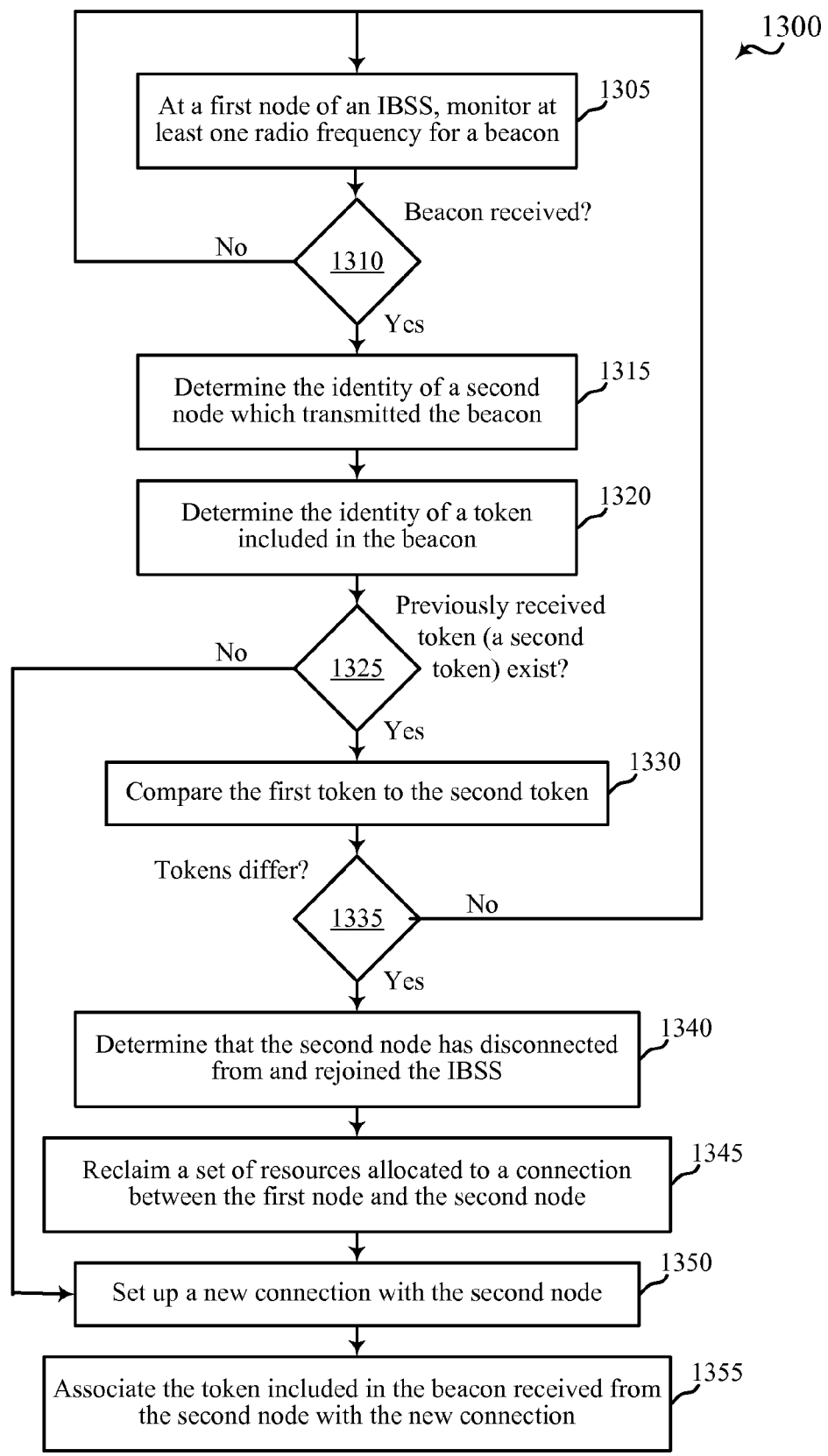
FIG. 13 shows a flowchart diagram illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to one or more aspects of the device 705 and/or 905 described with reference to FIGS. 7 and/or 9. In some embodiments, a device such as one of the devices 705 and/or 905 may execute one or more sets of codes to control the functional elements of the device to perform the functions described below.

At block 1305, a first node of an IBSS may monitor at least one radio frequency for a beacon, and at block 1310, the first node may determine whether a beacon is received. The method 1300 may loop between block 1305 and block 1310 until a beacon is received. Upon receipt of a beacon, the method 1300 may proceed to block 1315.

At block 1315, the identity of a second node of the IBSS, which second node transmitted the beacon received at block 1310, may be determined. The identity of the second node may in some cases be determined based at least in part on a node identifier included in the beacon.

The first node may in some cases include one or more aspects of the device 705 and/or 905 described with reference to FIGS. 7 and/or 9, and the second node may in some cases include one or more aspects of the device 705 and/or 805 described with reference to FIGS. 7 and/or 8. The operation(s) at block 1305 and/or 1310 may in some cases be performed using the IBSS connection manager 715 and/or 915 described with reference to FIGS. 7 and/or 9, and/or the beacon monitor 930 described with reference to FIG. 9. The operation(s) at block 1315 may in some cases be performed using the IBSS connection manager 715 and/or 915 described with reference to FIGS. 7 and/or 9, and/or the node identifier 935 described with reference to FIG. 9.

In some embodiments, the beacon from the second node may be received during a monitoring period, prior to expiration of a timer associated with detecting the disconnection of the second node.

At block 1320, a token included in the beacon received from the second node may be identified. The token included in the beacon may be referred to below as a first token. The operation(s) at block 1320 may in some cases be performed using the IBSS connection manager 715 and/or 915 described with reference to FIGS. 7 and/or 9, and/or the token identifier 940 described with reference to FIG. 9.

At block 1325, the first node may determine whether a token associated with the second node was previously received by the first node. The existence of a previously received token associated with the second node may indicate that the second node was previously connected to the IBSS, but at some point disconnected from and rejoined the IBSS. If not, the method 1300 may proceed to block 1350. Otherwise, the method 1300 may proceed to block 1330. The previously received token, when it exists, may be referred to as a second token.

At block 1330, the first token may be compared to the second token, and at block 1335 the first node may determine whether there is a difference between the first token and the second token. When there is no difference, the method 1300 may proceed to block 1305. Otherwise, the method may proceed to block 1340.

The operation(s) at block 1325, block 1330, and/or block 1335 may in some cases be performed using the IBSS connection manager 715 and/or 915 described with reference to FIGS. 7 and/or 9, and/or the token comparator 950 described with reference to FIG. 9.

At block 1340, and based at least in part on the difference between the first token and the second token, the first node may determine that the second node has disconnected from and rejoined the IBSS. The operation(s) at block 1340 may in some cases be performed using the IBSS connection manager 715 and/or 915 described with reference to FIGS. 7 and/or 9, and/or the rejoinder evaluator 945 described with reference to FIG. 9.

At block 1345, and responsive to the determination that the second node has disconnected from and rejoined the IBSS, a set of resources allocated to a connection between the first node and the second node may be reclaimed. The connection between the first node and the second node may be a connection that existed between the first node and the second node before the second node disconnected from and rejoined the IBSS. In some cases, reclaiming the set of resources allocated to the connection between the first node and the second node may include tearing down the connection between the first node and the second node. The operation(s) at block 1345 may in some cases be performed using the IBSS connection manager 715 and/or 915 described with reference to FIGS. 7 and/or 9, and/or the resource reclaimer 955 described with reference to FIG. 9.

At block 1350, and also responsive to the determination that the second node has disconnected from and rejoined the IBSS, a new connection with the second node may be set up (i.e., a new connection between the first node and the second node may be set up). The operation(s) at block 1350 may in some cases be performed using the IBSS connection manager 715 and/or 915 described with reference to FIGS. 7 and/or 9, and/or the connection initiator 960 described with reference to FIG. 9.

At block 1355, the token included in the beacon received from the second node, at block 1310, may be associated with the new connection set up at block 1350. The operation(s) at block 1355 may in some cases be performed using the IBSS connection manager 715 and/or 915 described with reference to FIGS. 7 and/or 9, and/or the token manager 965 described with reference to FIG. 9.

Thus, the method 1300 may provide for wireless communication. The method 1300 is just one implementation and the operations of the method 1300 may be rearranged or otherwise modified such that other implementations are possible.

In some embodiments, one or more aspects of the method 1200 and the method 1300 may be combined.

According to aspects of the present description, an apparatus of wireless communication may include means for receiving, by a first node of an IBSS, a beacon from a second node of the IBSS, the beacon including a token; and means for determining, based at least in part on the token, that the second node has disconnected from and rejoined the IBSS.

In certain examples, the token may be a first token, and the apparatus may further include means for comparing the first token to a second token associated with the second node. The determination that the second node has disconnected from and rejoined the IBSS may be based at least in part on a difference between the first token and the second token. The second token associated with the second node may include a previously received token from the second node.

In certain examples, the apparatus may include means for reclaiming a set of resources allocated to a connection between the first node and the second node responsive to the determination that the second node has disconnected from and rejoined the IBSS. Reclaiming the set of resources may include tearing down the connection between the first node and the second node.

In certain examples, the apparatus may include means for setting up a new connection with the second node responsive to the determination that the second node has disconnected from and rejoined the IBSS. The means for setting up the new connection may be further configured to associate the token of the beacon from the second node with the new connection. Additionally or alternatively, the means for setting up the new connection may be further configured to update an expected sequence number for the second node in response to determining that the second node has disconnected from and rejoined the IBSS.

In certain examples, the beacon from the second node may be received during a monitoring period prior to expiration of a timer associated with detecting disconnection of the second node. In certain examples, the beacon from the second node may include an integer value of a counter.

According to additional aspects of the present specification, a computer program product may include a non-transitory computer-readable medium having stored code configured to cause at least one processor to receive, by a first node of an IBSS, a beacon from a second node of the IBSS, the beacon including a token; and determine, based at least in part on the token, that the second node has disconnected from and rejoined the IBSS.

In certain examples, the token may be a first token, and the computer-readable medium may further include code configured to cause the at least one processor to compare the first token to a second token associated with the second node. The determination that the second node has disconnected from and rejoined the IBSS may be based at least in part on a difference between the first token and the second token. The second token associated with the second node may include a previously received token from the second node.

In certain examples, the computer-readable medium may further include code configured to cause the at least one processor to reclaim a set of resources allocated to a connection between the first node and the second node responsive to the determination that the second node has disconnected from and rejoined the IBSS. Reclaiming the set of resources may include tearing down the connection between the first node and the second node.

In certain examples, the computer-readable medium may further include code configured to cause the at least one processor to set up a new connection with the second node responsive to the determination that the second node has disconnected from and rejoined the IBSS. The computer-readable medium may additionally include code configured to cause the at least one processor to associate the token of the beacon from the second node with the new connection. Additionally or alternatively, the computer-readable medium may include code configured to cause the at least one processor to update an expected sequence number for the second node in response to determining that the second node has disconnected from and rejoined the IBSS.

In certain examples, the beacon from the second node may be received during a monitoring period prior to expiration of a timer associated with detecting disconnection of the second node. In certain examples, the beacon from the second node may include an integer value of a counter.

According to further aspects of the present description, an apparatus of wireless communication may include means for generating a token at a node, the token indicating that the node has disconnected from and rejoined an IBSS; and means for transmitting a beacon including the token to the IBSS responsive to the node rejoining the IBSS.

In certain examples, the token may include a first token, and the means for generating the token at the node may be configured to generate the first token based at least in part on a second token associated with at least one previous connection of the node over the IBSS. Generating the first token may include, for example, incrementing the second token according to a predefined pattern to generate the second token.

In certain examples, the apparatus may further include means for setting up a new connection with at least a second node of the IBSS responsive to transmitting the beacon including the token to the IBSS. In certain examples, the beacon may be transmitted prior to an expiration of a monitoring period associated with detecting disconnection of the node from the IBSS.

According to further aspects of the present description, a computer program product may include a non-transitory computer-readable medium having stored code configured to cause at least one processor to generate a token at a node, the token indicating that the node has disconnected from and rejoined an IBSS; and transmit a beacon including the token to the IBSS responsive to the node rejoining the IBSS.

In certain examples, the token may include a first token, and the code configured to cause the at least one processor to generate the token at the node may be further configured to cause the at least one processor to generate the first token based at least in part on a second token associated with at least one previous connection of the node over the IBSS. Generating the first token may include, for example, incrementing the second token according to a predefined pattern to generate the second token.

In certain examples, the computer-readable medium may further include computer-readable code configured to cause the at least one processor to set up a new connection with at least a second node of the IBSS responsive to transmitting the beacon including the token to the IBSS. In certain examples, the beacon may be transmitted prior to an expiration of a monitoring period associated with detecting disconnection of the node from the IBSS.

The detailed description set forth above in connection with the appended drawings describes exemplary embodiments and does not represent the only embodiments that may be implemented or that are within the scope of the claims. The terms "example" and "exemplary," when used in this description, mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
receiving, by a first node of an independent basic service set (IBSS), a beacon from a second node of the IBSS, the beacon comprising a token; and
determining, based at least in part on the token, that the second node has disconnected from and rejoined the IBSS.

2. The method of claim 1, wherein the token comprises a first token, the method further comprising:
comparing the first token to a second token associated with the second node;
wherein determining that the second node has disconnected from and rejoined the IBSS is based at least in part on a difference between the first token and the second token.

3. The method of claim 2, wherein the second token associated with the second node comprises a previously received token from the second node.

4. The method of claim 1, further comprising:
reclaiming a set of resources allocated to a connection between the first node and the second node responsive to the determination that the second node has disconnected from and rejoined the IBSS.

5. The method of claim 4, wherein reclaiming the set of resources allocated to the connection between the first node and the second node comprises:
tearing down the connection between the first node and the second node.

6. The method of claim 1, further comprising:
setting up a new connection with the second node responsive to the determination that the second node has disconnected from and rejoined the IBSS.

7. The method of claim 6, further comprising:
associating the token of the beacon from the second node with the new connection.

8. The method of claim 6, further comprising:
updating an expected sequence number for the second node in response to determining that the second node has disconnected from and rejoined the IBSS.

9. The method of claim 1, wherein the beacon from the second node is received during a monitoring period prior to expiration of a timer associated with detecting disconnection of the second node.

10. The method of claim 1, wherein the beacon from the second node comprises an integer value of a counter.

11. A device for wireless communication, comprising:
a receiver configured to receive a beacon from a node of an independent basic service set (IBSS), the beacon comprising a token; and
an IBSS connection manager configured to determine, based at least in part on the token, that the node has disconnected from and rejoined the IBSS.

12. The device of claim 11, wherein the token comprises a first token, and the IBSS connection manager is further configured to:
compare the first token to a second token associated with the node;
wherein the determination that the node has disconnected from and rejoined the IBSS is based at least in part on a difference between the first token and the second token.

13. The device of claim 12, wherein the second token associated with the node comprises a previously received token from the node.

14. The device of claim 12, wherein the IBSS connection manager is further configured to:
reclaim a set of resources allocated to a connection between the device and the node responsive to the determination that the node has disconnected from and rejoined the IBSS.

15. The device of claim 14, wherein the IBSS connection manager is further configured to:
tear down the connection between the device and the node, and set up a new connection with the node responsive to the determination that the node has disconnected from and rejoined the IBSS.

16. The device of claim 11, wherein the IBSS connection manager is further configured to:
set up a new connection with the node responsive to the determination that the node has disconnected from and rejoined the IBSS.

17. The device of claim 16, wherein the IBSS connection manager is further configured to:
associate the token of the beacon from the node with the new connection.

18. The device of claim 16, wherein the IBSS connection manager is further configured to:
update an expected sequence number for the node in response to determining that the node has disconnected from and rejoined the IBSS.

19. The device of claim 11, wherein the beacon from the node is received during a monitoring period prior to expiration of a timer associated with detecting the disconnection of the node.

20. The device of claim 11, wherein the beacon from the node comprises an integer value of a counter.

21. A method of wireless communication, comprising:
generating a token at a node, the token indicating that the node has disconnected from and rejoined an independent basic service set (IBSS); and
transmitting a beacon comprising the token to the IBSS responsive to the node rejoining the IBSS.

22. The method of claim 21, wherein the token comprises a first token and generating the token comprises:
generating the first token based at least in part on a second token associated with at least one previous connection of the node over the IBSS.

23. The method of claim 22, wherein generating the first token further comprises:
incrementing the second token according to a predefined pattern to generate the first token.

24. The method of claim 21, further comprising:
setting up a new connection with at least a second node of the IBSS responsive to transmitting the beacon comprising the token to the IBSS.

25. The method of claim 21, wherein the beacon is transmitted prior to an expiration of a monitoring period associated with detecting disconnection of the node from the IBSS.

26. A device for wireless communication, comprising:
an independent basic service set (IBSS) connection manager configured to generate a token, the token indicating that the device has disconnected from and rejoined an IBSS; and
a transmitter configured to transmit a beacon comprising the token to the IBSS responsive to the device rejoining the IBSS.

27. The device of claim 26, wherein the token comprises a first token and the IBSS connection manager is further configured to:
generate the first token based at least in part on a second token associated with at least one previous connection of the device over the IBSS.

28. The device of claim 27, wherein the IBSS connection manager is further configured to:
increment the second token according to a predefined pattern to generate the first token.

29. The device of claim 26, wherein the IBSS connection manager is further configured to:
set up a new connection with at least a second device of the IBSS responsive to transmitting the beacon comprising the token to the IBSS.

30. The device of claim 26, wherein the beacon is transmitted prior to an expiration of a monitoring period associated with detecting disconnection of the device from the IBSS.

* * * * *